Henry J. Hibshman  
Robert N. Dolph  
Inventors

By W. O. T Heilman Attorney

Patented Feb. 20, 1951

2,542,521

UNITED STATES PATENT OFFICE 2,542,521

PROCESS FOR SEGREGATING OXYGENATED HYDROCARBONS

Henry J. Hibshman, Plainville, and Robert N. Dolph, Somerville, N. J., assignors to Standard Oil Development Company, a corporation of Delaware Application August 6, 1948, Serial No. 42,818

5 Claims. (Cl. 260—450)

This invention relates to a process for treating hydrocarbon oils with solid adsorbents. The process of this invention is of particular application to the segregation of oxygenated hydrocarbons from other types of hydrocarbons by contact with a synthetic gel adsorbent. The process of the invention is suitable for continuously segregating an oxygenated hydrocarbon stream into a portion rich in acidic oxygenated hydrocarbons, a portion rich in other types of oxygenated hydrocarbons, and a portion rich in hydrocarbons other than oxygenated hydrocarbons. The process is characterized by requiring relatively simple equipment and operating procedures to obtain sharp segregations as indicated above.

It is well known to the art that various types of hydrocarbons may be separated according to chemical type by selective adsorption processes. Thus, naphthenic constitutents may be separated from aromatic constituents, olefins may be separated from paraffins, oxygenated hydrocarbons can be separated from other types of hydrocarbons, and various other segregation processes are possible. However, the commercial adoption of adsorption processes for segregations of this type has not proved to be a simple problem. Adsorption processes are characterized by requiring a relatively large mass of adsorbent to secure the desired segregation. Furthermore, the desorption and regeneration processes used to restore the activity of the adsorbent after adsorption have proved to be difficult and complicated. It is therefore the principal purpose of this invention to provide an improved process for segregating oxygenated hydrocarbons not involving cumbersome and inefficient apparatus and not involving complicated processing steps, substantially overcoming the aforementioned inherent difficulties of adsorption processes generally.

The nature and objectives of this invention may be fully understood from a consideration of the following description in conjunction with the accompanying drawings. In these drawings preferred embodiments of the process of this invention are illustrated as applied to the segregation of oxygenated hydrocarbons employing silica gel adsorbent.

Figure 1:
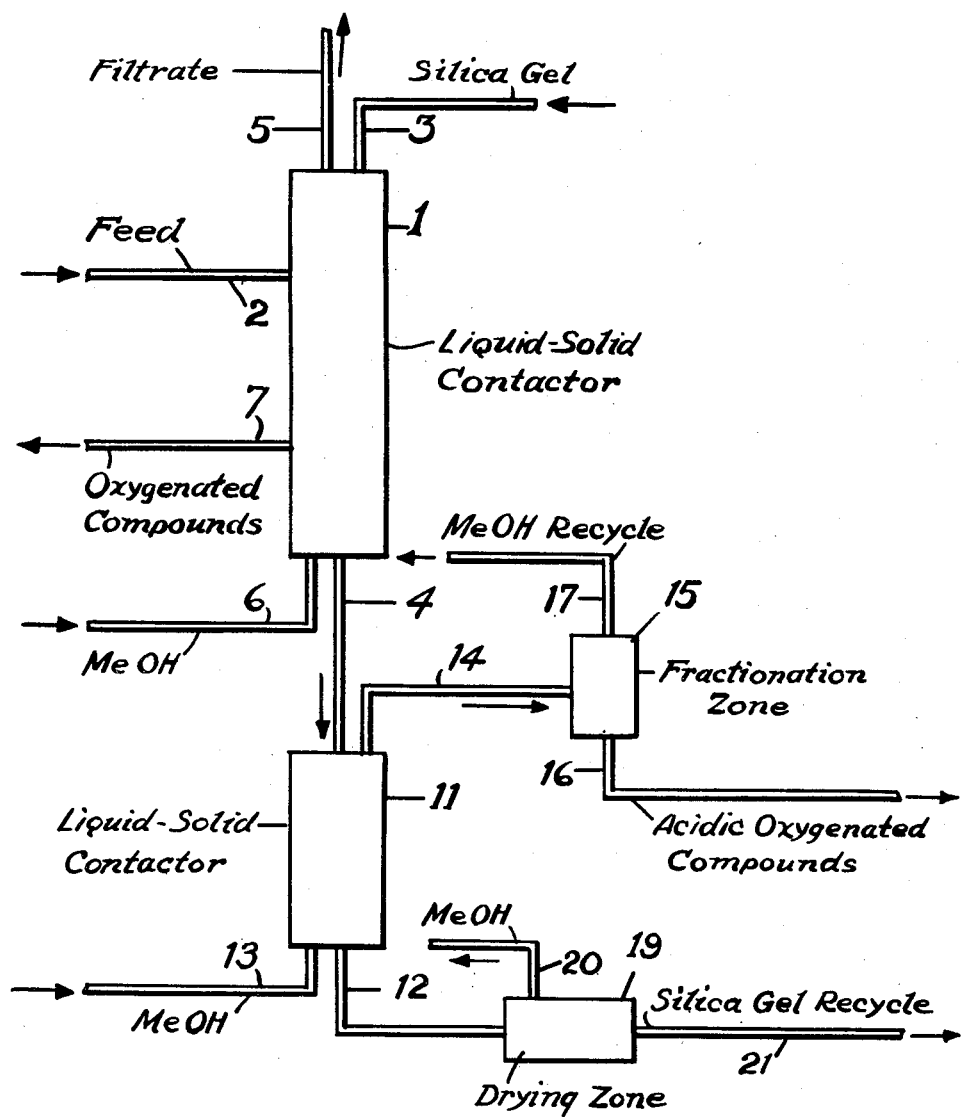
Figure 2:
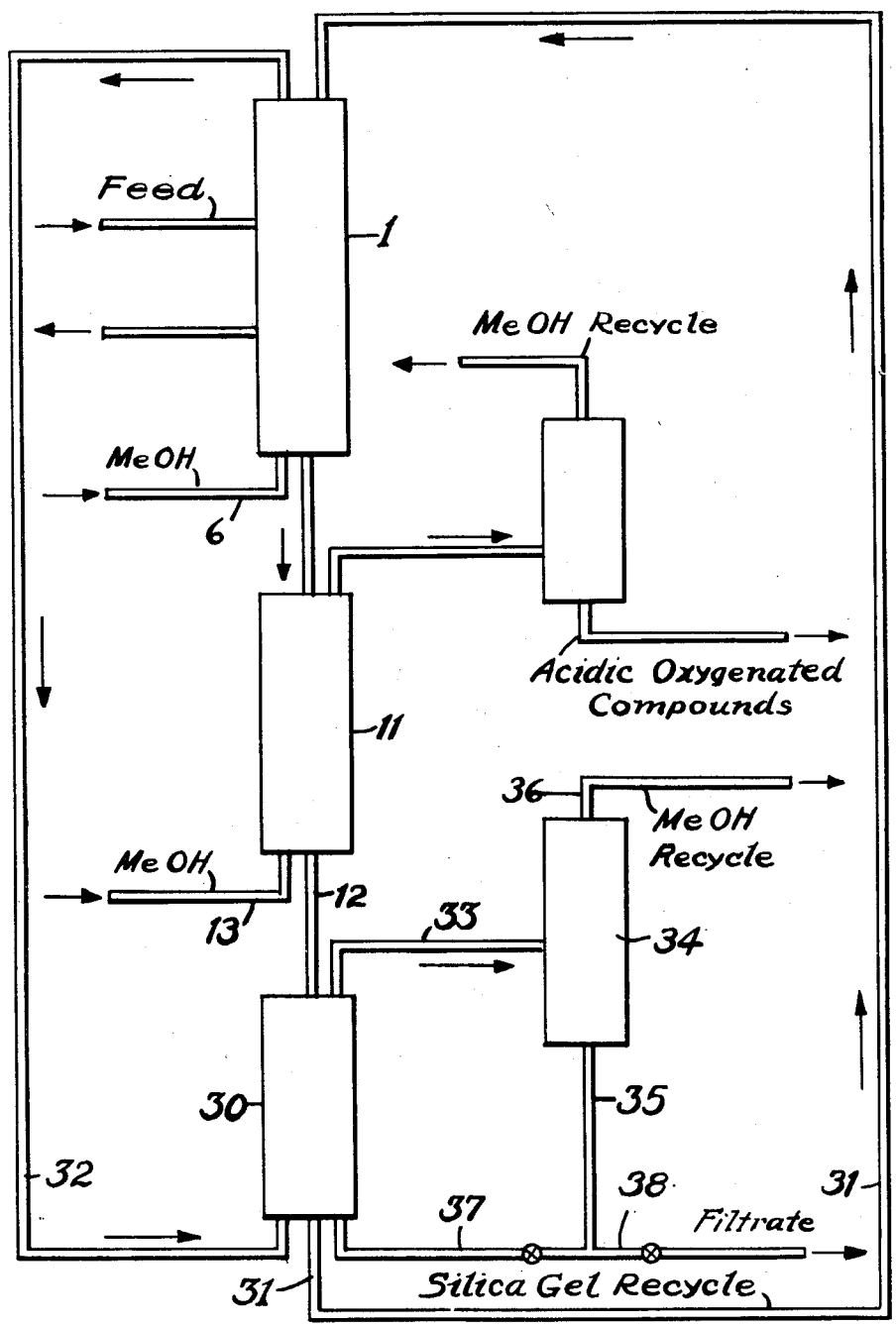

In the drawings, Figure 1 diagrammatically illustrates the segregation of oxygenated compounds in which the adsorbent is regenerated and recycled in the process as dry adsorbent and;

Figure 2 shows a preferred embodiment of the process in which the adsorbent is regenerated and recycled in the process without drying.

Referring now to Figure 1 of the drawing the general process of this invention is diagrammatically illustrated. As shown, the apparatus used comprises a vertical contacting tower identified by the numeral 1. This tower may comprise an unpacked column through which the silica gel and hydrocarbons are flowed or the tower may comprise any conventional solid-liquid contacting apparatus. For example, the tower may comprise the type of contactor in which a screw conveyor is used to move the solid adsorbent through the liquid to be contacted. It is to be understood therefore, that tower 1 may comprise any suitable type of apparatus for contacting a solid with a liquid. At a point approximately two-thirds the height of the tower, the feed hydrocarbons to be segregated are injected into the tower through line 2. The feed introduced to the tower may comprise any mixture of hydrocarbons containing oxygenated hydrocarbons. It is particularly contemplated that the feed introduced to the tower shown should comprise the product formed by catalytically hydrogenating carbon monoxide. The reaction by which this is accomplished is generally referred to as a Fischer synthesis reaction, and is well known, is becoming of considerable interest to the petroleum industry. As a product of such a reaction hydrocarbons are secured varying widely in type and nature. In particular, oxygenated hydrocarbons are secured in large percentages comprising alcohols, aldehydes, ketones, esters, and acids. One of the problems in connection with commercially adopting Fischer synthesis reactions is the problem of segregating the hydrocarbons obtained as a product. If the product is to be used as a fuel, it is essential to remove all oxygenated hydrocarbons, and in any case, it is valuable to recover the oxygenated compounds. Many suggestions have been made for suitably segregating the oxygenated hydrocarbons from such a product. Insofar as the process of this invention comprises a relatively simple and effective means of segregating oxygenated hydrocarbons, treatment of Fischer synthesis products will be taken as an example.

Assuming then that the feed to the tower 1 shown in Figure 1 comprises a hydrocarbon synthesis oil containing $C_7$ to $C_{10}$ hydrocarbons including alcohols, aldehydes, ketones, esters and acids, it is particularly contemplated that the fraction of this hydrocarbon oil boiling between 200° F. and 700° F. should comprise the feed product. This particular fraction of hydrocarbon synthesis oil generally contains approximately 2–5 weight percent oxygen and has from 10 to 25 weight percent oxygenated compounds in it. It is this feed material or any other desired type of feed material containing oxygenated compounds which is countercurrently contacted with silica gel in tower 1.

A suitable adsorbent such as silica gel is introduced at the top of tower 1 through line 3. As the drawing of Figure 1 is diagrammatic the actual means for suitably introducing the silica gel is not illustrated. Suitable means may be to use a basket valve or a star feeder permitting the introduction of solid silica gel into the liquid system present in tower 1. It is not necessary that the silica gel be of any particular size or nature although it is preferred that the silica gel be reasonably sized to eliminate any excess fines and to eliminate particles of excessive size. It is particularly preferred to use silica gel of about 20 to 100 mesh. The silica gel introduced to tower 1 through line 3 drops downwardly through the tower countercurrent to a flow of liquid in the tower which as will be seen generally flows upward. The silica gel having dropped through tower 1 may be removed at the bottom of the tower through line 4. Again, while not illustrated in the drawing, it is to be understood that a basket valve or a star feeder or equivalent means may be used to remove the solid silica gel from the liquid system. From what has been said, it will be seen that silica gel introduced at the top of the tower drops downwardly through the tower while feed introduced through line 2 will move upwardly through the tower to be removed through line 5 except for that portion of the feed adsorbed by the silica gel moving down the tower. The portion of the feed preferentially adsorbed constitutes the oxygenated hydrocarbons.

Tower 1 is preferably operated at temperatures of about 20 to 100 degrees centigrade and at sufficient pressure to maintain all components present in liquid phase.

As a novel feature of this invention a desorbing liquid is introduced to the bottom of the tower through line 6. Throughout this description the desorbing liquid will be assumed to be methyl alcohol although it is to be understood that many other desorbents could be employed. Generally any polar compound may be used as the desorbent. It is preferred however that the compound used should have a boiling point in the general range of about 20° C.–150° C. as such a desorbent may be more readily separated by distillation in the subsequent processing steps required. Polar organic compounds having up to three carbon atoms fall in the preferred class of desorbents. As typical examples of suitable desorbents, the following may be cited: low boiling alcohols up to four carbon atoms, acetone, methyl ethyl ketone, acetaldehyde, propionaldehyde, acetic acid, propionic acid, and water. As stated all of these desorbents may be designated by the term polar desorbents, constituting polar chemical compounds. As is well known each of these polar desorbents is more readily adsorbed by silica gel than are hydrocarbons. As a result, these compounds all act as desorbents when contacting silica gel containing adsorbed hydrocarbons, displacing the adsorbed hydrocarbons. Furthermore, these desorbents displace organic alcohols, aldehydes, ketones, and esters more readily than acids. It will be understood then that as the silica gel moves downwardly through the tower from line 3 towards line 4, as the silica gel contacts fresh feed introduced through line 2, oxygenated hydrocarbon constituents will be adsorbed by the silica gel to be carried downwardly with the silica gel into the lower part of tower 1. In the lower part of tower 1 the silica gel containing the oxygenated hydrocarbons as adsorbate will be contacted by the desorbent such as methyl alcohol introduced through line 6. This desorbent, as indicated, will displace the adsorbed hydrocarbons other than the acidic oxygenated hydrocarbons so as to free them from the silica gel. As a result, it has been found possible to position a withdrawal line, identified by the numeral 7, at approximately one third of the vertical height of the tower, through which line a stream of liquids rich in oxygenated compounds may be withdrawn. These oxygenated compounds are the alcohols, esters, aldehydes, and ketones originally present in the feed which are preferentially desorbed by the desorbing agent in the lower part of the tower. At the same time, it has been found that use of a desorbent in the quantities contemplated in this invention will not substantially desorb the acidic oxygenated compounds from the silica gel. Consequently the stream of material removed through line 7 will comprise oxygenated compounds essentially free of acidic oxygenated compounds and the stream removed through line 4 at the bottom of tower 1 will comprise silica gel plus the desorbent such as methyl alcohol plus acidic oxygenated compounds. It will therefore be seen that the general treating process illustrated in Figure 1 is effective to separate a hydrocarbon feed stream introduced through line 2 into three products. The first product withdrawal stream is that indicated at line 4 and comprises silica gel and methyl alcohol plus acidic oxygenated compounds. The second product withdrawal stream is positioned at line 7 and comprises the oxygenated compounds other than the acidic oxygenated compounds substantially without any methyl alcohol desorbent. The third product stream is that withdrawn through line 5 at the top of the tower and comprises hydrocarbons which have not been adsorbed to an appreciable extent by the silica gel.

It is a particular feature of the process of this invention that the stream withdrawn through line 7, rich in oxygenated compounds, is substantially free of any desorbing liquid and is substantially free of acidic oxygenated compounds. By properly adjusting the operating variables of the process it is possible to withdraw a stream through line 7 containing substantially all of the oxygenated compounds present in the feed with the exception of the acidic oxygenated compounds. Thus the stream withdrawn through line 7 will comprise the majority of the alcohols, aldehydes, ketones and esters originally present in the feed. Similarly, the stream withdrawn through line 4 will principally comprise the acids present in the original feed. By this means, it is possible to secure a comparatively sharp segregation of the oxygenated hydrocarbons from non-oxygenated hydrocarbons and also to secure a comparatively sharp segregation of the acidic oxygenated compounds from the other types of oxygenated compounds present.

A suitable manner for separating the acidic compounds from the silica gel and methyl alcohol present in the stream of line 4 is also illustrated in Figure 1. The product withdrawn through line 4 is introduced into a countercurrent solid-liquid treating zone 11. The silica gel introduced through line 4 drops through zone 11 to be removed at the bottom of the zone through line 12. A desorbent such as methyl alcohol is introduced at the bottom of zone 11 through line 13, flowing countercurrently upwardly through the tower to be removed at the top of the tower through line 14. The tower is preferably operated at elevated temperatures in the range of 200° to 500° F. and under sufficient pressure to maintain all constituents in liquid phase. Sufficient methyl alcohol, or other desorbent such as those indicated, is introduced through line 13 so as to substantially desorb all constituents from the silica gel. It is a particular feature of this invention that the desorbent used in tower 11 may comprise the same desorbent used in tower 1. Silica gel removed from the bottom of tower 11 through line 12 comprises substantially pure silica gel containing entrained and adsorbed methyl alcohol. The desorbed constituents of the silica gel may be removed from the top of tower 11 through line 14 together with the methyl alcohol or other desorbent used. The stream of methyl alcohol and desorbed constituents, comprising principally the acidic oxygenated compounds, are conducted through line 14 to still 15. Still 15 may comprise any desired type of fractionation zone. Thus, the still may comprise a conventional bubble cap type tower, or if desired, may comprise a simple packed fractionating tower. The fractionation zone is operated so as to remove the methyl alcohol or other desorbent used as an overhead product, and so as to permit removal of acidic compounds as a bottom product. This acidic oxygenated compounds are removed from still 15 through line 16 comprising substantially all of the acidic compounds originally present in the feed introduced to tower 1 through line 2. Methyl alcohol is removed as an overhead product through line 17 and may be recycled to treating zone 11. A part of the methyl alcohol is recycled to tower 1 to be introduced through line 6. The portion of the methyl alcohol recycled to tower 1 is cooled by means not shown in the drawing so as to drop the temperature of the methyl alcohol sufficiently for use in tower 1. If the methyl alcohol is recycled to zone 11, cooling is not necessary as it is desired to operate zone 11 at temperatures ranging between about 200 to 500° F.

The silica gel removed from line 12 of tower 11 may be conducted through line 12 to a drying zone 19 wherein the methyl alcohol is driven off overhead through line 20 to be recycled to zone 11. The dry silica gel may then be withdrawn through line 21 to be recycled to the top of tower 1 through line 3. Drying zone 19 may comprise any desired type of solid drier. If desired, the drying zone may comprise a simple type of tray drier, or more desirably, the zone may comprise a heating zone through which the silica gel is continuously moved while exposed to radiant heat from the walls of the zone.

Referring now to Figure 2 of the drawings, a further embodiment of this invention is illustrated eliminating the necessity for drying the silica gel. In this embodiment, parts of the process formerly described in connection with Figure 1 are identified by similar numerals. It will be seen that the top portion of the drawing illustrates the primary silica gel contactor identified by the numeral 1 while the portion of the process directly below this illustrates the methyl alcohol desorbing zone for completely stripping adsorbed constituents from the silica gel. In the process illustrated by Figure 2, silica gel withdrawn from zone 11 rather than being passed to a drying zone as in Figure 1, is conducted to a further liquid contacting zone identified by the numeral 30. The silica gel introduced to zone 30 through line 12 of zone 11 falls downwardly through zone 30 to be removed at the bottom of the tower through line 31. The silica gel in zone 30 is countercurrently contacted with filtrate removed from the top of tower 1 and recycled to the bottom of zone 30 through line 32. This filtrate comprises constituents originally present in the feed material which were not absorbed by the silica gel, for example, paraffinic constituents. This filtrate is therefore conducted upwardly through tower 30 countercurrent to the flow of silica gel in the zone. The filtrate may be removed at the top of zone 30 through line 33 for introduction to a still 34. As will be seen, a large volume of filtrate is maintained in zone 30 relative to the silica gel so that the filtrate is operative to desorb the methyl alcohol from the silica gel. If desired, zone 30 may be operated at an elevated temperature (200°–500° C.). The filtrate, together with desorbed methyl alcohol is then conducted through line 33 into the fractionating zone 34. Zone 34 may comprise any desired type of fractionation equipment and is operated so as to drive methyl alcohol off overhead and so as to permit removal as a bottoms product of filtrate stripped of methyl alcohol off overhead and so as to permit removal as a bottoms product of filtrate stripped of methyl alcohol through line 35. The methyl alcohol removed overhead through line 36 may be recycled into the process as desired. For example, the methyl alcohol may be recirculated into tower 11 through line 13, or a portion of the methyl alcohol from line 36 may be recirculated to tower 1 through line 6. The majority of the filtrate withdrawn from tower 34 is recycled to zone 30 through line 37. A portion of the filtrate is withdrawn through line 38 to be processed as desired. By virtue of the recycle arrangement for the filtrate, a high proportion of filtrate relative to silica gel may be maintained in zone 30. By this means it is possible to desorb the methyl alcohol from the silica gel, permitting removal of silica gel through line 31 substantially pure except for entrainment or adsorption of components of the filtrate. As these components may be readily displaced by oxygenated compounds, this silica gel is therefore in condition to be recycled to the top of tower 1. This recycling is illustrated in the drawing to be conducted by means of line 31. It is to be understood that in actual practice it would be required to use a gas lift or any suitable means to reconvey the silica gel to the top of tower 1.

As an example of the process of this invention, experiments were conducted to carefully check the operating variables. Because of the difficulty of accurately following the process through the continuous types of contactors described, experiments were conducted simulating the continuous process by using a large number of silica gel containing tubes arranged in the form of a tower. Each tube was of such a nature as to hold the silica gel in the tube while permitting liquid to fall through the tube. Liquid was introduced to the tubes to fall into a lower tube or to be removed from the system in an inverted duplication of the liquid flow in the processes described. Fresh silica gel tubes were added and spent silica gel tubes were removed while the tubes were moved around in sequence, to simulate the moving of silica gel through a continuous tower. The run was continued for a period of one week operating twenty-four hours a day, so that data was obtained reliably indicating the result to be obtainable in the type of process illustrated. A feed of 100 volumes was used, constituting a hydrocarbon synthesis oil boiling in about the range of 200° F. to 700° F. and containing 3.3% oxygen. A silica gel feed corresponding to about 300 weight per cent of the feed was employed. The desorbent used in this experiment was methyl alcohol, and 330 volume per cent of this desorbent was employed. At the portion of the system corresponding to the top of tower 1 or line 5, a product was obtained constituting 67 volumes of filtrate containing less than 0.1 weight per cent oxygen. It is to be seen therefore, that the filtrate obtained was substantially exhausted of oxygenated compounds. The product withdrawn from what corresponds to line 7 of tower 1 contained 17 volumes of oxygenated compounds, and was substantially free of any desorbent liquid. This product contained 12 weight per cent oxygen so that it is to be seen that the product was rich in oxygenated compounds. However, the product contained substantially no acidic oxygenated compounds as evidenced by a titration of the product. It was found that the acidic oxygenated compounds were obtained as 16 volumes at the bottom of the tower through line 4 containing about 6 weight per cent $O_2$. The process described therefore sharply segregated oxygenated hydrocarbons from other types of hydrocarbons, and furthermore segregated acidic oxygenated hydrocarbons from other types of oxygenated hydrocarbons. It is significant that during the experimental run, a sharp line of demarcation consistently existed between the methyl alcohol desorbent and the desorbed hydrocarbons. This separation line existed at what corresponds to a point somewhat below line 7 of tower 1. It is therefore contemplated that in the practice of this invention, suitable flow rates should be maintained so as to hold the stated line of demarcation adjacent to and somewhat below line 7 of tower 1.

In accordance with these experiments, it is contemplated that a preferred method of conducting the process of this invention is to employ a silica gel feed of approximately 200–500 weight per cent, and a desorbent feed of approximately 250–350 volume per cent based on the volume of feed hydrocarbon input. By operating the process as described it is possible to secure an oxygenated rich withdrawal containing substantially no desorbent, and it is possible to secure a hydrocarbon withdrawal containing substantially no oxygenated compounds. It is further possible to secure a stream rich in acidic oxygenated compounds.

It is to be understood that this invention is capable of many modifications within the reach of those skilled in the art. For example, it may be preferred to operate more than one treating zone as described; oxygenated compounds withdrawn from line 7 of zone 1 may be reintroduced to a similar treating zone for an even sharper fractionation of the oxygenated compounds. As a further modification of importance it is apparent that tower 1 may be divided into several stages. For example, a first stage may comprise the treatment corresponding to that received in the upper part of the tower above line 7 while the second stage may comprise the treatment corresponding to that received in the lower part of the tower below line 7. It is therefore to be understood that the appended claims are to be given a broad interpretation commensurate with the true contribution of this invention to the art.

What is claimed is:

1. In a process for segregating oxygenated hydrocarbons by contact with silica gel adsorbent comprising the steps of introducing a feed consisting of a mixture of hydrocarbons and oxygenated hydrocarbons including acidic components and compounds such as alcohols, ketones, aldehydes and esters into a vertical tower at a point above the middle of the tower, introducing silica gel at the top of said tower, said silica gel being removed from the bottom of the tower, the improvement which comprises introducing a $C_1$ to $C_4$ alcohol at the bottom of said tower, and withdrawing a side stream product from a point below the introduction of feed to the tower whereby an overhead product is withdrawn from the tower rich in hydrocarbons, the said side stream withdrawal is obtained rich in oxygenated hydrocarbons other than acidic components, and a bottom withdrawal is obtained rich in acidic components.

2. The process defined by claim 1 in which the feed comprises hydrocarbons obtained from a Fischer synthesis reaction boiling in the range of about 200° to 700° F., containing alcohols, aldehydes, ketones, esters and acids, having from about 7 to 20 carbon atoms.

3. The process defined by claim 1 in which the said $C_1$ to $C_4$ alcohol is methyl alcohol.

4. The process defined by claim 1 in which a line of demarcation between the hydrocarbons present in the tower and the $C_1$ to $C_4$ alcohol present in the tower, is maintained at a point somewhat below the said side stream withdrawal point.

5. The process defined by claim 1 in which the feed comprises 100 volumes, the silica gel comprises about 200 to 500 weight per cent of the feed, and the $C_1$ to $C_4$ alcohol comprises about 250 to 350 volume per cent of the feed.

HENRY J. HIBSHMAN.
ROBERT N. DOLPH.

REFERENCES CITED

The following references are of record in the file of this patent:

UNITED STATES PATENTS

| Number | Name | Date |
|---|---|---|
| 1,422,007 | Soddy | July 4, 1922 |
| 2,398,101 | Lipkin | Apr. 9, 1946 |
| 2,425,535 | Hibshman | Aug. 12, 1947 |

OTHER REFERENCES

U. S. Naval Technical Mission in Europe: "The Synthesis of Hydrocarbons and Chemicals From CO and $H_2$," page 88, Aug. 2, 1946.